(12) United States Patent
Scommegna et al.

(10) Patent No.: US 11,291,534 B2
(45) Date of Patent: Apr. 5, 2022

(54) MEASURING INSTRUMENT FOR ORTHODONTIC APPLIANCES

(71) Applicant: LEONE S.P.A., Sesto Fiorentino (IT)

(72) Inventors: Gabriele Scommegna, Tavernuzze Impruneta (IT); Maurizio Dolfi, Florence (IT)

(73) Assignee: LEONE S.P.A., Sesto Fiorentino (IT)

( * ) Notice: Subject to any disclaimer, the term of this patent is extended or adjusted under 35 U.S.C. 154(b) by 333 days.

(21) Appl. No.: 16/304,792

(22) PCT Filed: Jul. 13, 2017

(86) PCT No.: PCT/IT2017/000142
§ 371 (c)(1),
(2) Date: Nov. 27, 2018

(87) PCT Pub. No.: WO2018/020524
PCT Pub. Date: Feb. 1, 2018

(65) Prior Publication Data
US 2020/0315759 A1    Oct. 8, 2020

(30) Foreign Application Priority Data
Jul. 28, 2016    (IT) ........................ 102016000079343

(51) Int. Cl.
*A61C 19/04*    (2006.01)
*A61C 7/02*    (2006.01)
*A61C 7/10*    (2006.01)

(52) U.S. Cl.
CPC ................ *A61C 19/04* (2013.01); *A61C 7/02* (2013.01); *A61C 7/10* (2013.01)

(58) Field of Classification Search
CPC .............. A61C 19/04; A61C 7/02; A61C 7/10
(Continued)

(56) References Cited

U.S. PATENT DOCUMENTS 3,800,420 A    4/1974    Ouaknine
5,564,920 A    10/1996    Klapper

FOREIGN PATENT DOCUMENTS

CN    202761476 U    *    3/2013
CN    104114124 A    *    10/2014    ............... A61C 7/04
(Continued)

OTHER PUBLICATIONS

International Search Report and Written Opinion of the International Search Authority dated Nov. 17, 2017 in corresponding International application No. PCT/IT2017/000142; 8 pages.

*Primary Examiner* — Nicholas D Lucchesi
*Assistant Examiner* — Mirayda A Aponte
(74) *Attorney, Agent, or Firm* — Maier & Maier, PLLC

(57) ABSTRACT

A measuring instrument for orthodontic appliances including a body with a handle and a rectilinear head oriented orthogonally to the handle; an appendix protrudes from a distal edge of the head and it is orthogonal to the head, that is, the appendix is oriented parallel to the handle, and is formed by a base having a predetermined width from which emerges a pin having a length which is also predetermined; the head is provided with a millimeter scale on at least one side of the appendix; the width of the base is a value selected among a plurality of predetermined values and is equal to the distance between the bodies of a palatal expander in closed configuration.

12 Claims, 10 Drawing Sheets

(58) Field of Classification Search
USPC .......................................................... 433/72
See application file for complete search history.

(56) References Cited

FOREIGN PATENT DOCUMENTS

CN        105 796 203 A     7/2016
WO       2014/122680 A1    8/2014

* cited by examiner

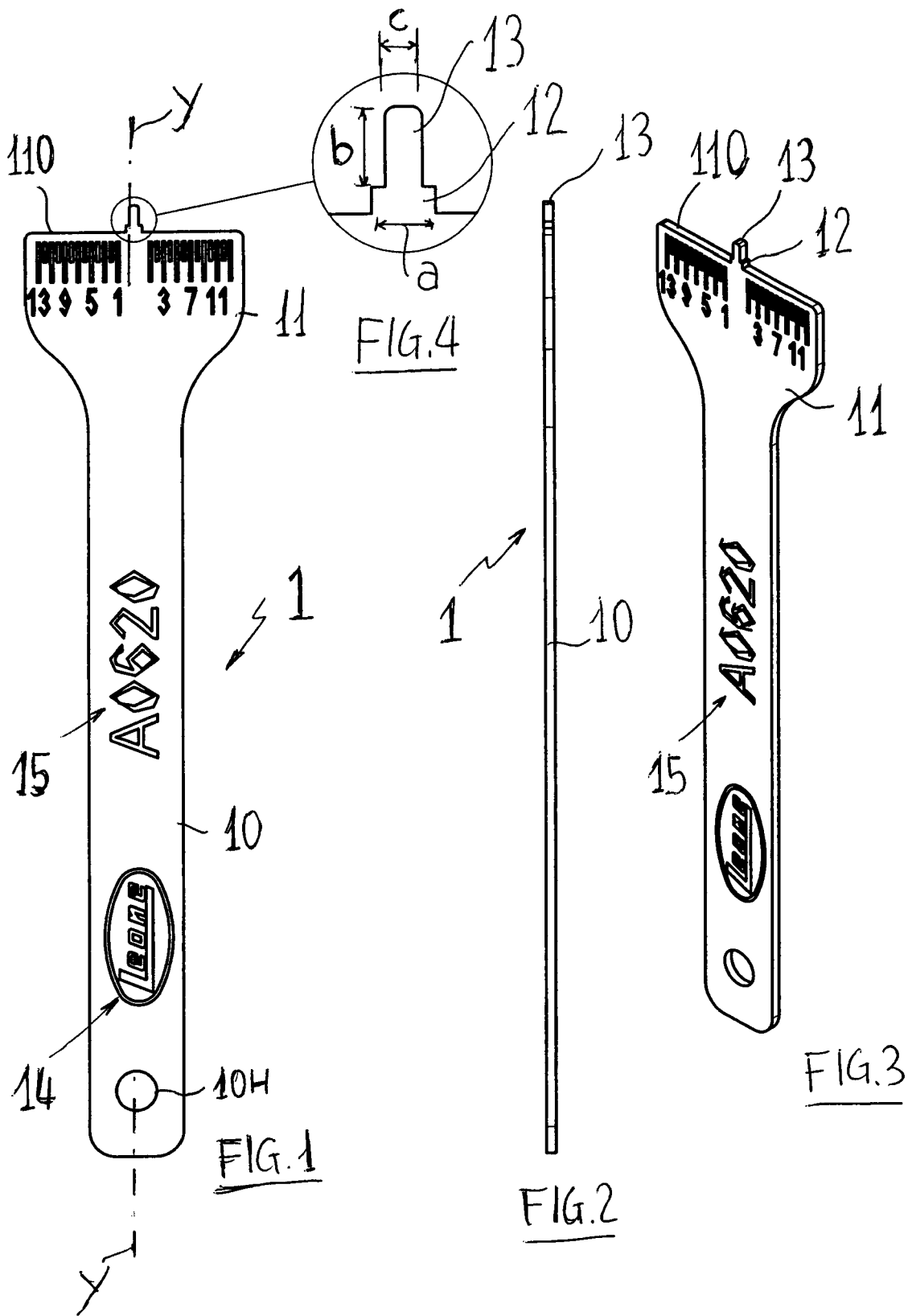

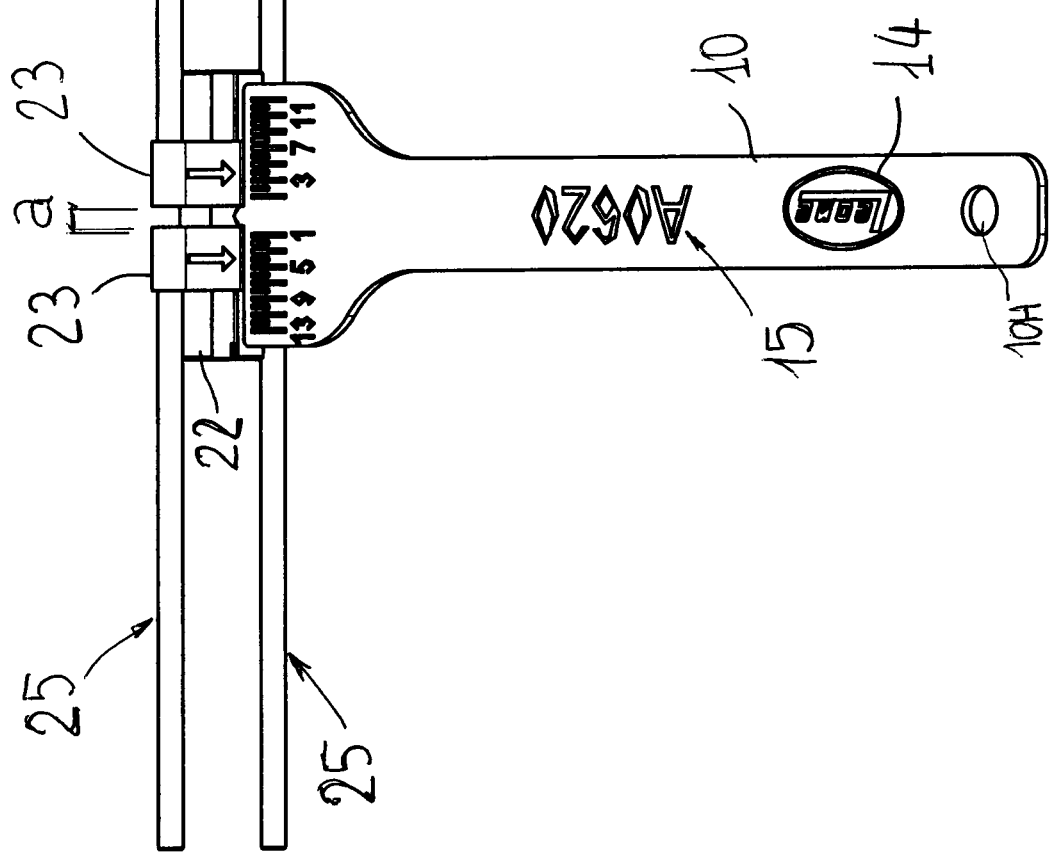

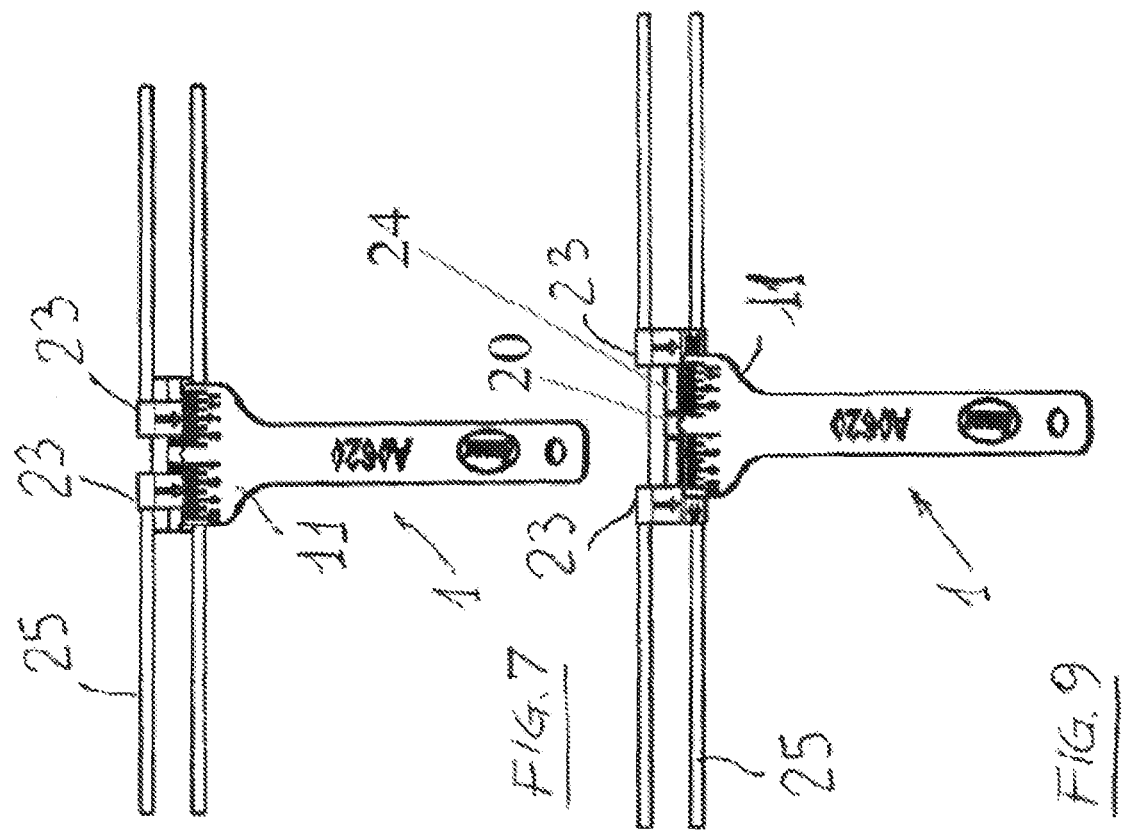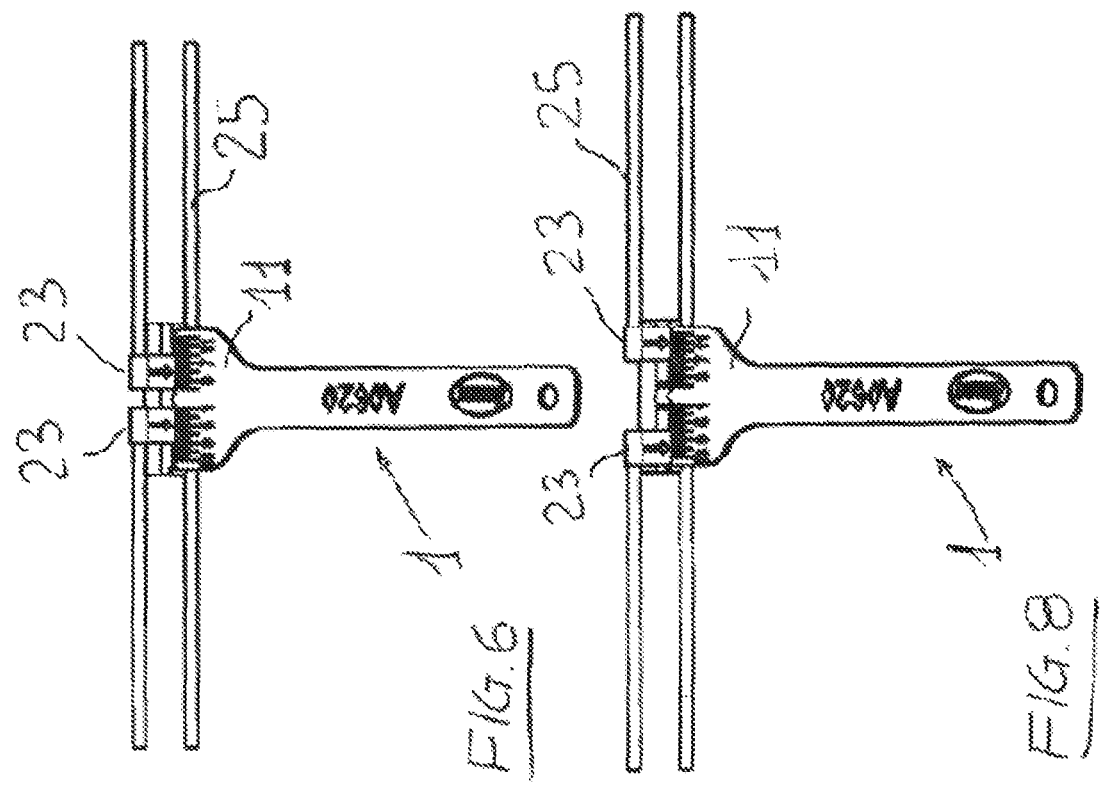

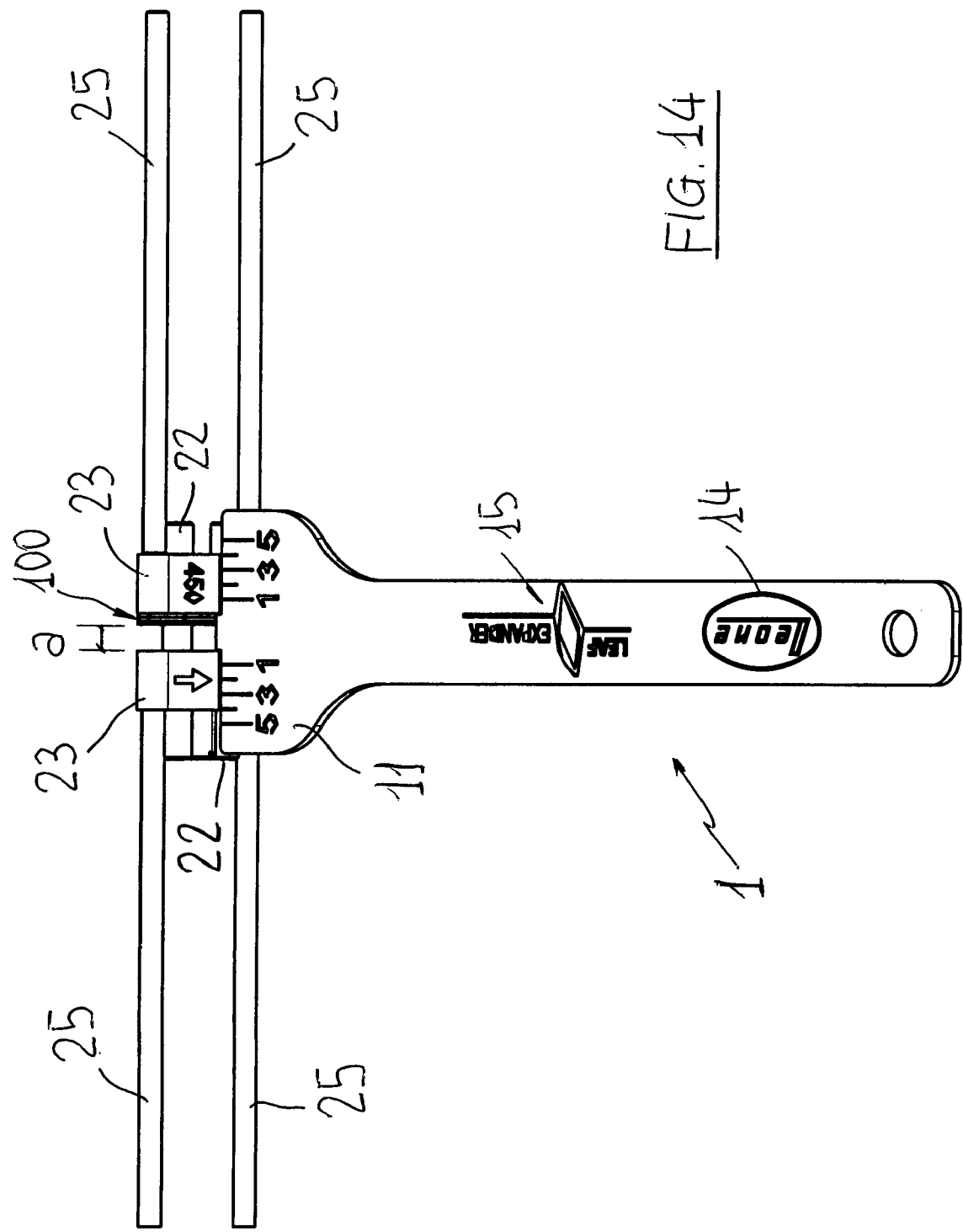

MEASURING INSTRUMENT FOR ORTHODONTIC APPLIANCES

FIELD

It is well known that in cases of skeletal underdevelopment of the upper jaw use is made of mechanical devices known as palatal separators or palatal expanders which essentially comprise two bodies whose mutual distance is controlled by a central screw. The latter is provided with a maneuvering portion on which radial holes are provided which enable to engage it and to rotate it by means of a suitable tool. The two bodies of the screw are provided with extension arms whose distal ends are shaped to engage one or more dental elements.

BACKGROUND

The present invention relates to an instrument for measuring the expansion of orthodontic appliances and to a kit comprising such a measuring instrument and a palatal expander.

FIG. 18 shows a palatal expander (E) of the bidirectional type: the bodies (C) move simultaneously, in opposite directions, along the guides (G); the central screw (V) engages corresponding threads arranged in both bodies (C) and is parallel to the guides (G); the outer ends of the arms (B) of the bodies (C) are shaped to anatomically engage the lingual side of a predetermined number of teeth (D). The appliance is activated by activating the screw (V) through a predetermined number of revolutions daily or at predetermined time intervals. The rotation of the screw (V) causes the mutual displacement of the bodies (C) which, through the arms (B), exert a thrust on the two sides of the dental arch. The treatment has a duration determined by the doctor who periodically performs clinical and radiographic controls.

The activation of the screw is generally entrusted to the patient's relatives who generally do not record the number of revolutions of the screw, so that the doctor is unable to correlate the operation of the device, that is, the actual number of rotations of the screw and thus the actual spacing of the bodies controlled by the latter, to the clinical and radiographic results.

The same drawbacks are found in the case of the expanders in which an elastic member is interposed between the aforementioned bodies and is periodically loaded by means of the central screw.

SUMMARY

The main aim of the present invention is to provide an instrument for measuring the actual degree of expansion of orthodontic appliances.

This result has been achieved, in accordance with the present invention, by adopting the idea of making a device having the features indicated in claim 1. Other features of the present invention are described in the dependent claims.

BRIEF DESCRIPTION OF THE DRAWINGS

An instrument according to the present invention allows the doctor to control the actual degree of activation of the orthodontic device in a simple and direct way, so allowing to accurately correlate the expansion measured with the clinical and radiographic controls. These and further advantages and features of the present invention will be more and better understood by each technician thanks to the following description and the accompanying drawings, provided by way of example but not being considered in a limitative sense, in which:

FIG. 1 represents a front view;
FIG. 2 represents a side view of an instrument in accordance with a possible embodiment of the present invention;
FIG. 3 represents a perspective view of an instrument in accordance with a possible embodiment of the present invention;
FIG. 4 represents a detail view of an instrument in accordance with a possible embodiment of the present invention;
FIG. 5 represents the instrument of FIGS. 1-4 in a conditions of use;
FIG. 6 represents the instrument of FIGS. 1-4 in another condition of use;
FIG. 7 represents the instrument of FIGS. 1-4 in another condition of use;
FIG. 8 represents the instrument of FIGS. 1-4 in another condition of use;
FIG. 9 represents the instrument of FIGS. 1-4 in another condition of use;
FIG. 14 represents the tool of FIGS. 10-13 in a different conditions of use.

DETAILED DESCRIPTION

Figures 10, 11, 12, 13:
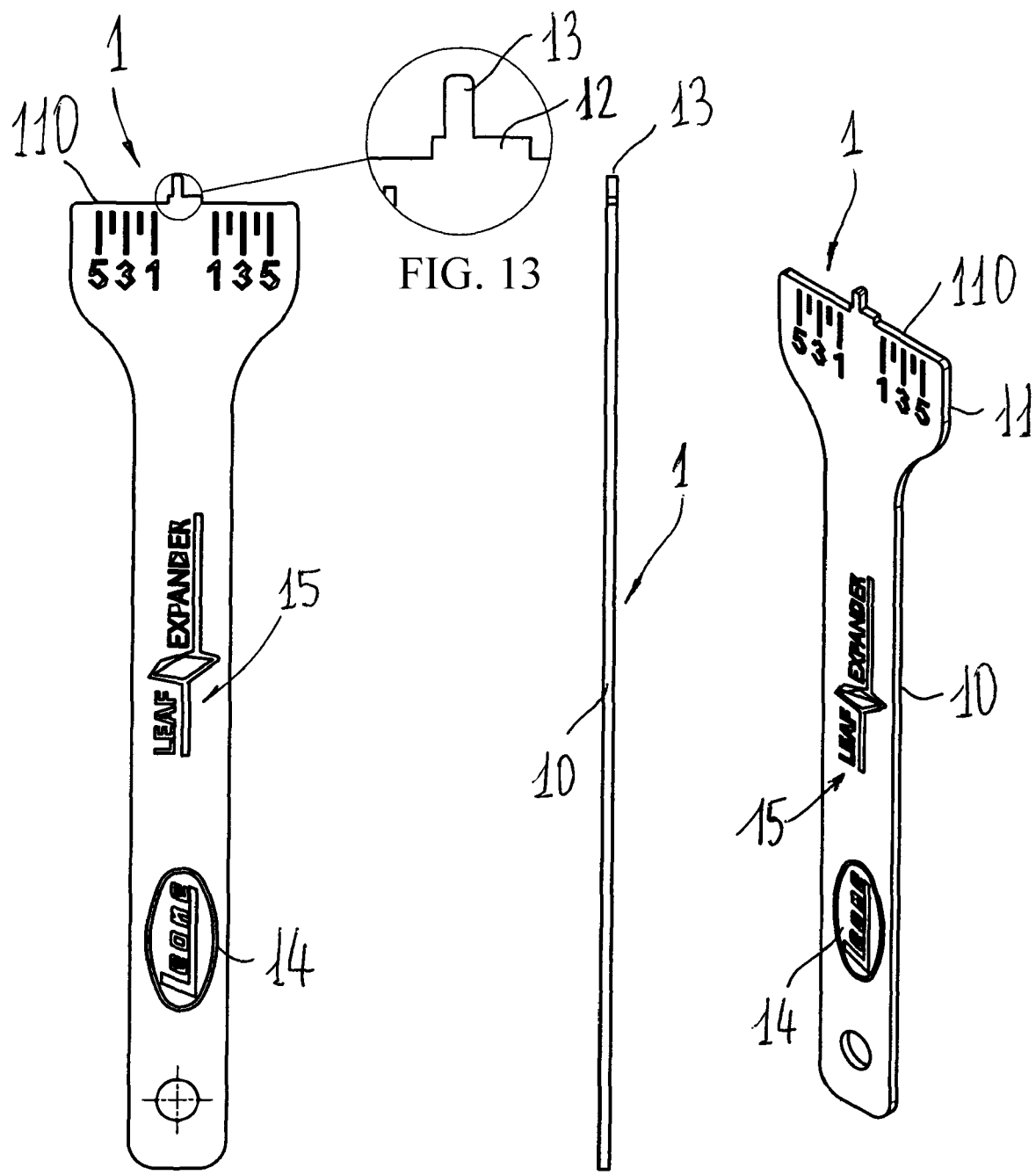
FIG. 10 is a front view.
FIG. 11 is a side view of an instrument in accordance with a further embodiment of the present invention.
FIG. 12 is a perspective view of an instrument in accordance with a further embodiment of the present invention.
FIG. 13 is a detail view of an instrument in accordance with a further embodiment of the present invention.

Reduced to its essential structure and with reference to FIGS. 1-9 of the accompanying drawings, an instrument according to the present invention consists of a flat body (1) with a handle (10) and a rectilinear graduated head (11) orthogonal to the handle. The head portion (11) is wider than the handle (10) to which it is connected. From the distal edge (110) of the head portion (11) protrudes an appendix (12, 13).

Said appendix (12, 13) is orthogonal to the head portion (11), i.e. oriented parallel to the handle (10), and is formed by a base (12) having a predetermined width (a), base from which protrudes a plug (13), also the plug having predetermined length (b) and width (c). A bilateral millimeter scale is provided on the head portion (11), on the two sides of the appendix (12, 13). In the example, said scale consists of twenty-six indexes spaced 0.5 mm from each other, divided into thirteen indexes on the left and thirteen indexes on the right of appendix (12, 13). These indexes are numbered (in the example, the numbering is 1 to 13 for the longer indexes, while the shortest intermediate indices are not numbered). The width (a) of the base (12) is equal to the distance between the bodies of a palatal expander in closed configuration (expansion not activated or zero expansion). In the example, the pin (13) is in a central position, i.e. it is arranged along a central symmetry axis (y-y) of the instrument.

Figure 17:
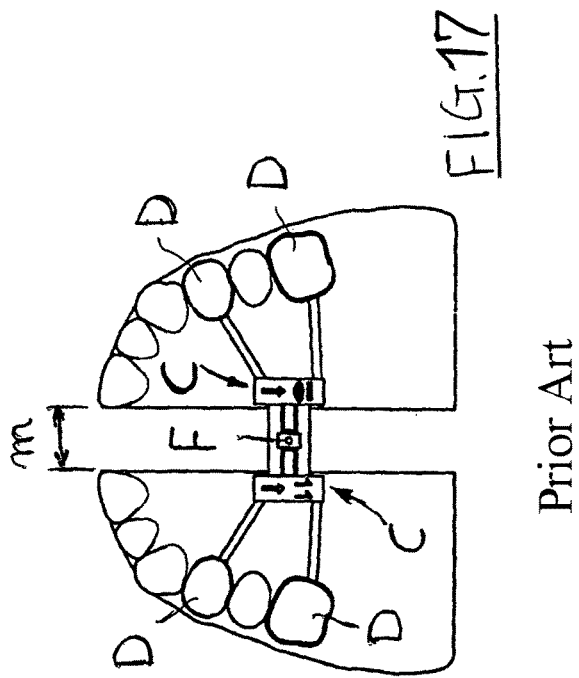
FIG. 17 shows a palatal expander in open configuration.
Figure 16:
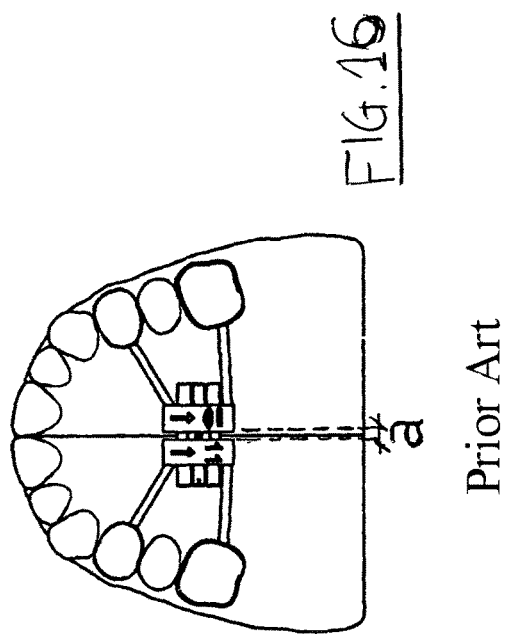
FIG. 16 shows a palatal expander in closed configuration.
Figure 18:
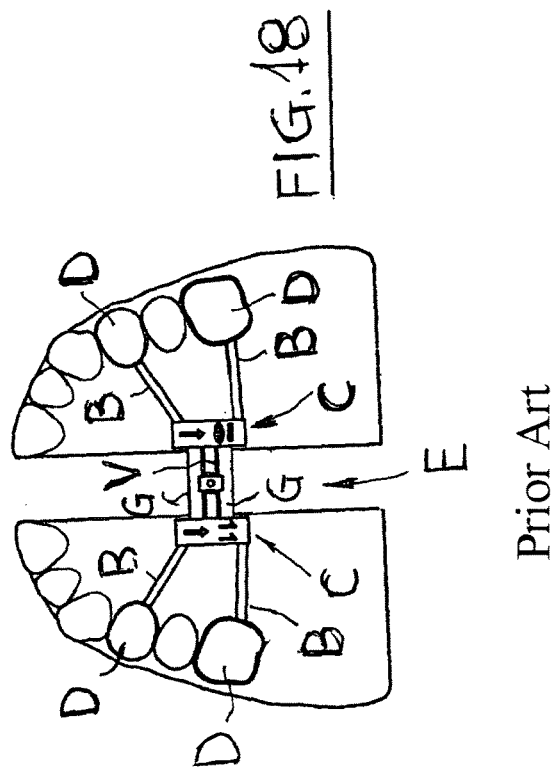
FIG. 18 is identical to FIG. 17 and is used to better represent the main parts of a known palatal expander.
Figure 19:
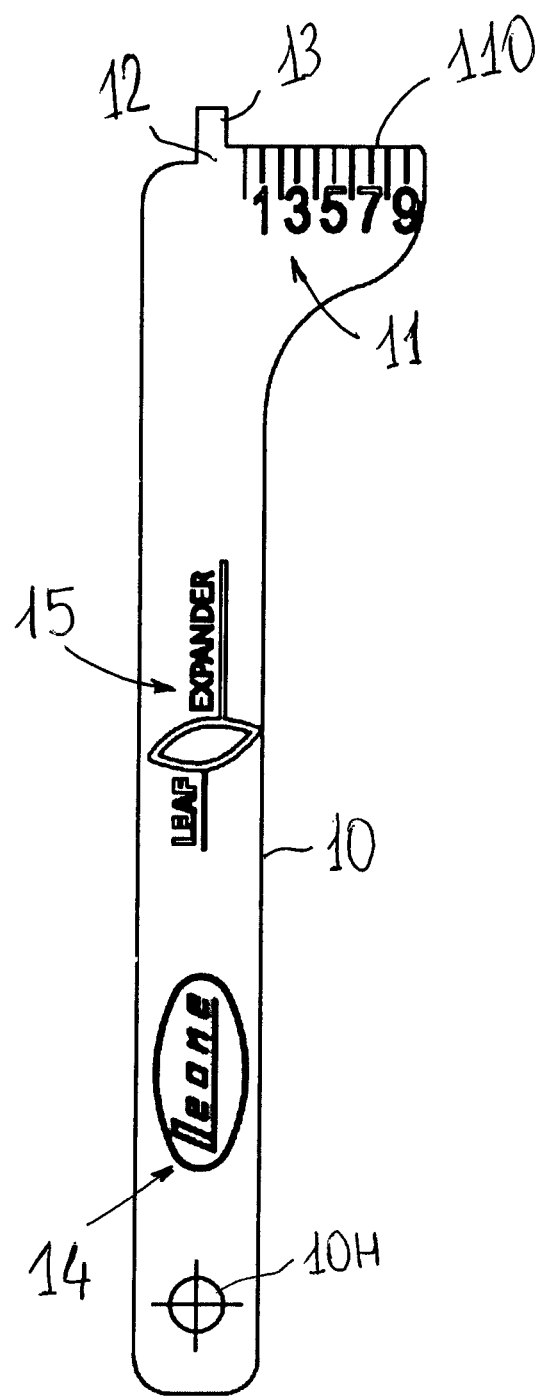
FIG. 19 represents a further embodiment of a device according to the present invention.

For example, the expander is of the type comprising a central screw (24) with opposite threads on the two sides, with a larger diameter central portion (20), so-called "maneuvering" portion, for rotating it by means of a plug-in tool which can be inserted in suitable cavities or radial holes provided on its surface. In FIG. 17, which represents the same type of screw in fully open configuration, a radial hole on the maneuvering portion of the screw is marked with the reference "F". Two guides formed by parallel cylindrical rods (22) are connected to the screw stem; two metal bodies (23) are inserted on said guides and have longitudinal holes in which the same rods are positioned passing through. In each of the bodies (23) a hole is provided with a thread for receiving a corresponding side of the central screw. Such an expander is known in itself. The expander is activated by rotating the screw (24) so as to space the bodies (23) which, when the screw (24) is rotated, move on the guides (22). Each revolution or part of revolution of the screw (24) corresponds to a stroke of the bodies (23) on the guides (22) whose width depends on the thread of the screw (24). The bodies (23) act on the teeth through the arms (25) integral with the same bodies.

The doctor inserts the pin (13) of the appendix (12, 13) in to a hole (21) of the maneuvering head of the screw (24) with the expander device in configuration of use (expander positioned in the oral cavity) and reads the distance between the bodies (23) thanks to the millimeter scale imprinted on the head (11) of the instrument. In FIG. 5 the expansion is nothing. In FIG. 6 the measured expansion is 1 mm. In FIGS. 7, 8, and 9, the measured expansion is 3 mm, 7 mm and 13 mm respectively. Needless to say that the scale amplitude is related to the maximum opening (m) of the screw, which is particularly visible in FIG. 17.

The mark of the manufacturer (14) and/or the identification code or trade name of the expander (15) can be imprinted on the handle (10). In the examples, the identifier code of the expander is "A0620", that is, an identifier code of a palatal expander produced by t the applicant or the word "Leaf Expander", which is the trade name of a further expander produced by the applicant.

There is also a hole (10H) for a safety wire.

With reference to the example shown in FIGS. 10-15, the orthodontic device is of the type in which an elastic element (100) exerts a thrust on the bodies (23) and is loaded by the central screw (24). Such a device is described in WO2014/122680. According to the example shown in FIGS. 10-15, the pin (13) of the appendix (12, 13) is eccentric with respect to the axis (y-y) of the instrument. Even in this case, the base (12) has a predetermined width (a). In this example, the aforementioned five in number for each side of the scale.

Figure 15:
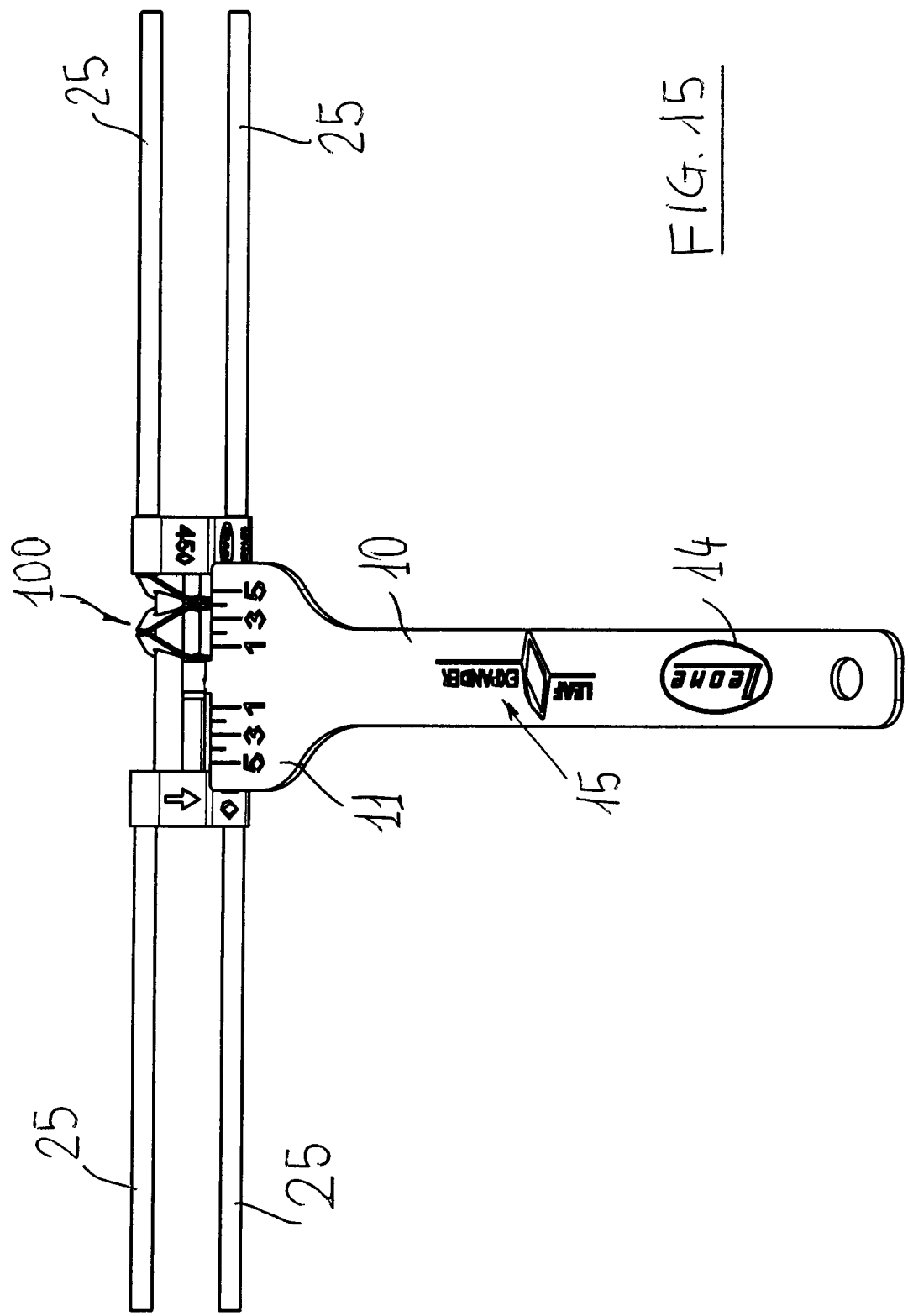
FIG. 15 represents the tool of FIGS. 10-13 in a different condition of use.

The value (a), as shown in FIG. 14, is equal to the distance between the bodies of the expander in closed position. The height (b) of the pin (13) is of sufficient value to allow it to be inserted into a radial hole (21) of the maneuvering head of the central screw. In this version of the instrument, the pin (13) is eccentric with respect to the axis (y-y) because the elastic body (100) of the orthodontic device is laterally positioned with respect to the maneuvering head of the central screw. FIG. 15 shows the measure carried out with the. expander in expanding phase.

The aforementioned value "a" is a selected value between a plurality of predetermined values, considering that the screws of the expander devices manufactured by different manufacturers may have a different distance "a" between the bodies of the screw in closed configuration. For this purpose, the indication of the type of screw (in the example, the code "A620" or the term "Leaf Expander") is useful to enable the operator to immediately identify the screw to which this measuring instrument is associated.

The values (b) and (c) relative to the plug (13) are such that it can be inserted into the said hole (F).

Figure 22:
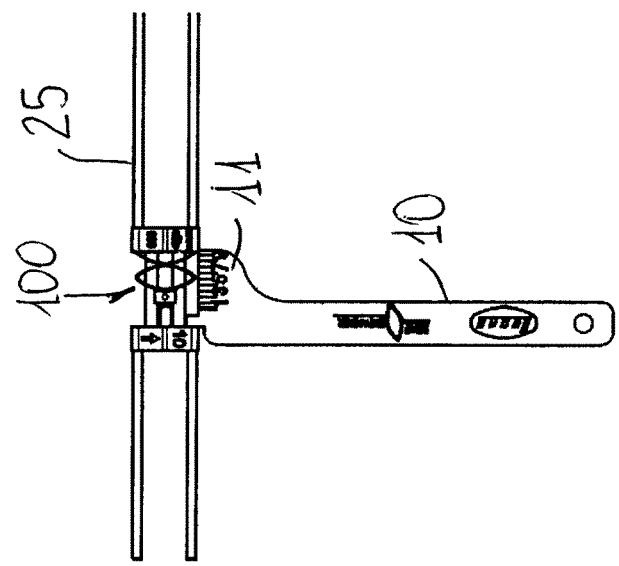
FIG. 22 represent a further embodiment of a device according to the present invention.
Figure 21:
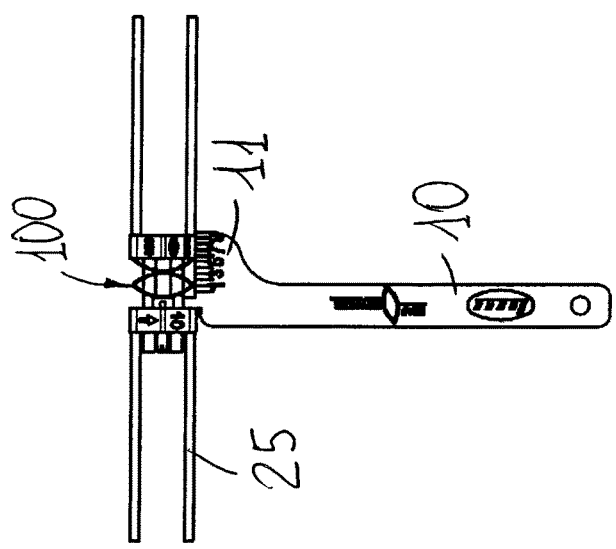
FIG. 21 represent a further embodiment of a device according to the present invention.
Figure 20:
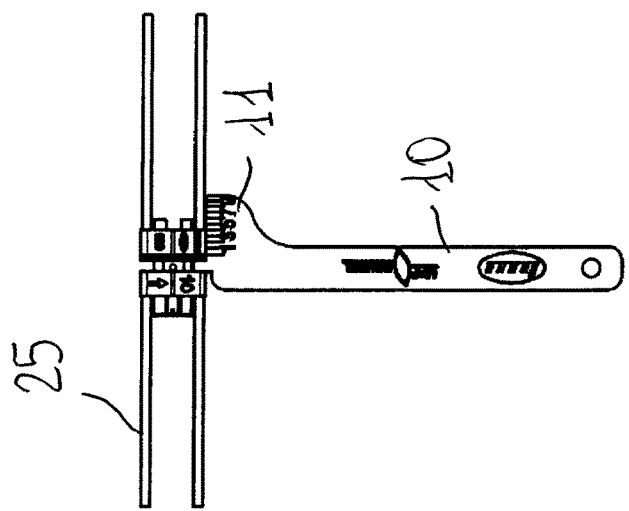
FIG. 20 represent a further embodiment of a device according to the present invention.

In accordance with the example shown in FIGS. 19-22, said scale is provided only at one side of the appendix (12, 13). Experimental tests conducted by the applicant have shown a particular efficacy of this conformation of the device of the invention which enables a measurement of the expansion even easier for the doctor who performs the verification, since the expansion is measured on a single side as the total value indicated on the scale. FIGS. 20-22 show the device of FIG. 19 in various steps of carrying out expansion measures on the orthodontic apparatus similarly to what has been described with reference to the previous examples. In FIGS. 20-22 the orthodontic device is of the type shown in FIGS. 14 and 15.

Figure 24:
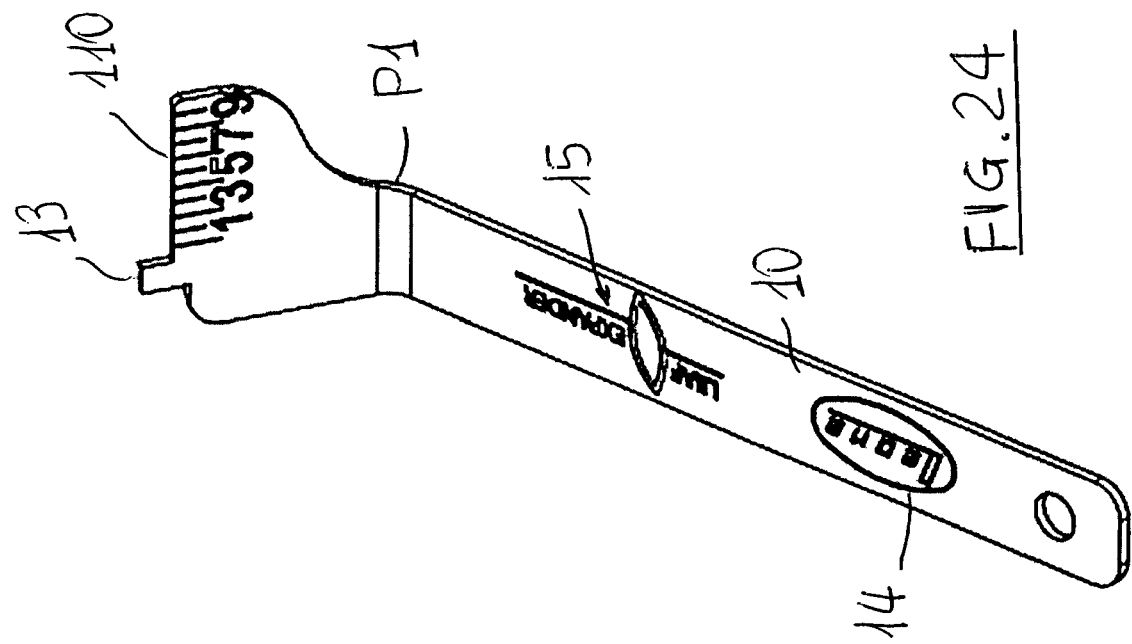
FIG. 24 represent a further embodiment of a device according to the present invention.
Figure 23:
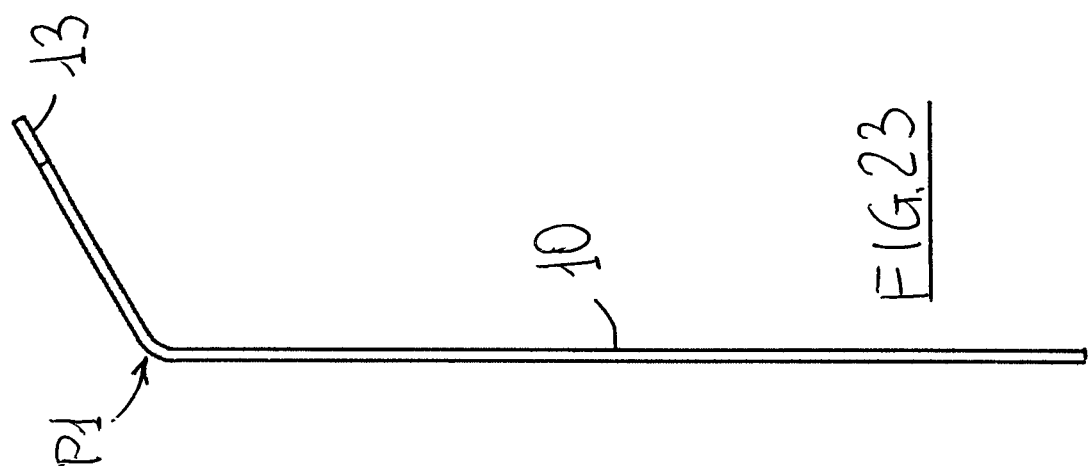
FIG. 23 represent a further embodiment of a device according to the present invention.

In accordance with the example shown in FIGS. 23-24, the body (10) and the head (110) are on different planes, with a bending (PI) that facilitates the reading of the expansion measurement when the pin (13) Is inserted into the hole of the expansion screw in the patient's oral cavity, as the scale on the head portion (11) is oriented towards the doctor performing the check in such a way as to facilitate the same reading.

In the examples of FIGS. 19-24, the width of the base (12) is equal to the width of the plug (13), while in the preceding examples the width of the base (12) is larger than the width of the plug (13).

As said in the introduction, an object of the invention is also a kit made up of a measuring instrument of the type as described above and of a palatal expander comprising two bodies (23) connected to a motion mechanism (24; 100) which makes it possible to distance them in a controlled mode in the passage from a configuration in which the expander is closed to a configuration in which the expander is fully or partially open; in the closed configuration said bodies (23) are at a predetermined distance (a) from each other and the width of said base (12) corresponds to said distance (a).

In practice, execution details can, however, vary in an equivalent way to the individual elements described and illustrated and to their reciprocal arrangement without departing from the scope of the solution idea adopted and therefore remaining within the limits of the protection afforded by present patent.

The invention claimed is:

1. A measuring instrument for orthodontic appliances, comprising:
    a body with a handle and a rectilinear head oriented orthogonally to the handle, wherein an appendix protrudes from a distal edge of the rectilinear head, such that the appendix is oriented parallel to the rectilinear head, and is formed by a base having a predetermined width from which emerges a pin having a length which is also predetermined, in which the rectilinear head is provided with a millimeter scale on at least one side adjacent of the appendix, wherein the orthodontic appliance is a palatal expander comprising two bodies adapted to assume a closed configuration in which they are at a minimum distance from each other and an open configuration in which the same bodies are at a greater distance from each other, and wherein the predetermined width of the base is a value selected among a plurality of predetermined values and is equal to the minimum distance between the bodies of the palatal expander, wherein the two bodies of the palatal expander are controlled by a moving mechanism which allows for separation in a controlled manner along a rectilinear direction in the transition from the closed configuration of the palatal expander to a completely or partially open configuration of the palatal expander, wherein, in the closed configuration of the palatal expander, said bodies are at a predetermined distance from one another corresponding to the predetermined width of the base of the measuring, instrument.

2. The measuring instrument according to claim 1, wherein said scale is formed by a plurality of indexes to the right and to the left of said appendix.

3. The measuring instrument according to claim 1, wherein said scale is formed by a plurality of indexes only to one side of said appendix.

4. The measuring instrument according to claim 1, wherein said scale is formed by a plurality of indexes distanced 0.5 mm from each other, one half of the indexes being to the left and one half of the indexes being to the right of the appendix.

5. The measuring instrument according to claim 1, wherein said indexes are numbered.

6. The measuring instrument according to claim 1, wherein said pin is in a central position, arranged along a central symmetry axis of the measuring instrument.

7. The measuring instrument according to claim 1, wherein said pin is in a lateral position with respect to a central symmetry axis of the measuring instrument.

8. The measuring instrument according to claim 1, wherein said body is a flattened body.

9. The measuring instrument according to claim 1, wherein said rectilinear head is wider than the handle.

10. The measuring instrument according to claim 1, wherein said rectilinear head is inclined at a predetermined angle relative to the handle.

11. The measuring instrument according to claim 1, wherein the palatal expander comprises a screw and wherein the indication of the type of said screw is applied to the measuring instrument.

12. A kit comprising an orthodontic appliance, and a measuring instrument including a body with a handle and a rectilinear head oriented orthogonally to the handle, wherein an appendix protrudes from a distal edge of the rectilinear head, such that the appendix is oriented parallel to the rectilinear head, and is formed by a base having a predetermined width from which emerges a pin having a length which is also predetermined, in which the rectilinear head is provided with a millimeter scale on at least one side adjacent of the appendix, wherein the orthodontic appliance is a palatal expander comprising two bodies adapted to assume a closed configuration in which they are at a minimum distance from each other and an open configuration in which the same bodies are at a greater distance from each other, and wherein the predetermined width of the base is a value selected among a plurality of predetermined values and is equal to the minimum distance between the bodies of the palatal expander, and further wherein the palatal expander comprises two bodies controlled by a moving mechanism which allows to separate them in a controlled manner along a rectilinear direction in the transition from the closed configuration of the palatal expander to a completely or partially open configuration of the palatal expander, wherein in the closed configuration of the palatal expander said bodies are at a predetermined distance from one another corresponding to the predetermined width of the base of the measuring instrument.

* * * * *